(12) United States Patent
El-Sherif et al.

(10) Patent No.: US 6,374,043 B1
(45) Date of Patent: Apr. 16, 2002

(54) FULLY-INTEGRATED VCM DRIVER WITH CONTROLLED AND PREDICTABLE CLASS-AB LINEAR OPERATION

(75) Inventors: Alaa Y. El-Sherif, Dallas; Joao Carlos Brito; Marcus M. Martins, both of Richardson, all of TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/681,407

(22) Filed: Mar. 30, 2001

(51) Int. Cl.$^7$ .............................................. G05B 19/10
(52) U.S. Cl. .................... 388/907.2; 318/567; 327/587; 330/262
(58) Field of Search ....................... 388/907.2; 318/567, 318/590; 330/262, 274

(56) References Cited

U.S. PATENT DOCUMENTS

| | | | |
|---|---|---|---|
| 5,216,381 A | * 6/1993 | Botti et al. ................. | 330/253 |
| 5,297,024 A | 3/1994 | Carobolante | |
| 5,384,524 A | * 1/1995 | Romano ..................... | 318/569 |
| 5,566,369 A | * 10/1996 | Carobolante ................. | 360/75 |
| 5,631,527 A | * 5/1997 | Canclini ..................... | 318/254 |
| 5,818,180 A | * 10/1998 | Canclini ..................... | 318/254 |
| 6,150,853 A | * 11/2000 | Chrappan et al. ............ | 327/108 |
| 6,151,186 A | 11/2000 | O'Farrell | |
| 6,229,273 B1 | * 5/2001 | Kelly et al. .................. | 318/254 |

OTHER PUBLICATIONS

Gray and Meyer, Analysis and Design of Analog Integrated Circuits (3rd ed.) Hamilton Printing Company 1993, pp. 378–382.

"An All NPN AB Biased Power Output Stage" IBM TDB 1977 pp. 2825–2826.

"Memphis VCM Driver with Extenral H–bridge" (a schematic diagram of a circuit admitted only for purposes of this application to be prior art).

"Oscar VCM Driver with on–chip H–bridge" (a schematic diagram of a circuit admitted only for purposes of this application to be prior art).

* cited by examiner

*Primary Examiner*—Marlon T. Fletcher
*Assistant Examiner*—Rina I. Duda
(74) *Attorney, Agent, or Firm*—W. Daniel Swayze, Jr.; W. James Brady; Frederick J. Telecky, Jr.

(57) ABSTRACT

A circuit (41) to provide drive voltages to a voice coil motor (VCM) (50) of a hard disk drive (10) has identical high and low side drivers (42, 44, 46, and 48) connected to the VCM (50). Each driver has an output FET (52) selectively connecting the VCM (50) to a control voltage (58). A Class-AB output pair (54 and 54') in parallel with the output FETs (52 and 52') provides continuous and linear Class-AB operation at the output node (60) around the crossover point, while the output FETs (52 and 52') are kept not conducting. This approach offers extremely low level of crossover harmonic distortion. Each FET of the Class-AB pair (54 and 54') is connected to a biasing FET (56 and 56') to provide the desired Class-AB quiescent current. Preferably the output FET (52), quiescent current controlling FET (54), and biasing FET (56) are fully integrated.

24 Claims, 3 Drawing Sheets

FULLY-INTEGRATED VCM DRIVER WITH CONTROLLED AND PREDICTABLE CLASS-AB LINEAR OPERATION

BACKGROUND OF THE INVENTION

1. Field of the Invention

This invention relates to improvements in methods and apparatuses for dynamic information storage or retrieval, and more particularly to improvements in methods and circuitry for controlling the position of the data transducer, or head, used in mass data storage devices, hard disk drive devices, or the like, and still more particularly to improvements in driver circuitry and methods for use in positioning such data transducer that can be fully integrated.

2. Relevant Background

Mass data storage devices include tape drives, as well as hard disk drives that have one or more spinning magnetic disks or platters onto which data is recorded for storage and subsequent retrieval. Hard disk drives may-be used in many applications, including personal computers, set top boxes, video and television applications, audio applications, or some mix thereof. Many applications are still being developed. Applications for hard disk drives are increasing in number, and are expected to further increase in the future. Mass data storage devices may also include optical disks in which the optical properties of a spinning disk are locally varied to provide a reflectivity gradient that can be detected by a laser transducer head, or the like. Optical disks may be used, for example, to contain data, music, or other information.

The data transducer or head used in mass data storage devices is selectively positioned to desired locations of the disk by a voice coil motor (VCM). The circuitry that provides drive signals to the VCM typically has a pair of high and low side driver circuits. In operation, each set of high and low side drivers is connected on respective opposite sides of the VCM, and operate in a manner in which a high side driver from one set is activated together with a low side driver of the other set to drive a current through the VCM in one direction to move the head in a respective first direction. When the respective high and low side drivers of the opposite sides are activated, a current is driven in the opposite direction through the VCM to move the head in the opposite direction.

Typically, two transistors are used for each driver set. They provide a switching function and a sensing function. In the past, the two transistor circuit VCM driver embodiments incorporated a large single, or driving, power transistor in each side of driver set, which has been used to control both the Class-AB quiescent current and the driver output impedance. The second transistor, referred to as the sense transistor, senses the switching voltages provided by a head position control circuit, and produces a voltage to switch its associated driving transistor on or off. The driving transistor, however, is generally very large, compared to the switching transistor. In fact, in the past, the large driving transistors have been supplied as external transistors to the otherwise fully integrated driving circuit. Because of the severe mismatch between the sense transistor and the output power transistor, the sense transistor experiences a significant sub-threshold range of operation. This results in an undesirable "dead zone" during switching in which no current flows through the driver. This results in an undesirably high switchover harmonic distortion in the driving signals.

In the two transistors per driver side circuits, the size of the driver transistor is dictated by the output impedance design requirement. This consequently results in undesirable high Class-AB quiescent current due to the large ratio between the driving transistor and the sense (switching) transistor, as well as the design need to maintain an acceptable level of switchover harmonic distortion. This high current results in disadvantageous power dissipation in the drivers during the Class-AB operation.

What is needed therefore, is a means for controlling the output impedance of a VCM driver circuit, as well as controlling its Class-AB operation and associated harmonic content with a circuit that ideally can be fully integrated into a single driver circuit.

SUMMARY OF INVENTION

In light of the above, therefore, it is an object of the invention to provide a Class-AB driver circuit for a VCM of a mass data storage device in which better control and predictability of the Class-AB quiescent current can be achieved.

It is another object of the invention to provide a Class-AB driver circuit of the type described in which the output impedance of the drivers can be modified, if required, without a significant impact to performance and stability of the circuit.

It is another object of the invention to provide a Class-AB driver circuit of the type described in which predictable power consumption and crossover linearity of the VCM current can be achieved.

It is still another object of the invention to provide a Class-AB driver circuit of the type described that has lower harmonic switchover distortion.

It is still yet another object of the invention to provide a Class-AB driver circuit of the type described that can be fully integrated.

As will become apparent from the description below, one of the advantages of the circuit of the invention is that all of the transistors of each driver section can be, and preferably are, fully integrated onto a single silicon wafer.

It is another advantage of the invention to provide a circuit of the type described in which the Class-AB operation can be maintained and controlled during switchover, without the occurrence of discontinuities thereat.

It is another advantage of the invention that possible subthreshold operation of the switching transistors can be avoided or eliminated.

It is another advantage of the invention that the total harmonic distortion of the circuit can be greatly reduced due to the elimination of any discontinuities at the Class-AB switchover point. It has been found, for example, that operation at frequencies as high as 50 KHz can be achieved with harmonic distortion in the region of 0.6%, or less.

It is yet another advantage of the invention that the system incorporating circuits constructed in accordance with the invention can be operated at much higher frequencies, for example on the order of 50 KHz without significant harmonic distortion.

It is another advantage of the invention that the power dissipation of the circuit during switchover is greatly reduced from previous circuits.

Yet another advantage is that circuits constructed in accordance with the invention are flexible in enabling size modifications of the output circuit, without requiring a complete circuit redesign.

These and other objects, features, and advantages of the invention will be apparent to those skilled in the art from the following detailed description of the invention, when read in conjunction with the accompanying drawings and appended claims.

According to the present invention, instead of having one power transistor to control both the Class-AB quiescent current and the driver output impedance, each of those design parameters is independently controlled by a separate power transistor.

According to a broad aspect of the invention, a circuit is presented for providing drive voltages to a voice coil motor (VCM) of a mass data storage device. The circuit has two driver sets, each including a high side driver and a low side driver, for connection to respective opposite sides of the VCM. Each driver includes an output FET to selectively connect an output node connected to the VCM to a first reference potential and a quiescent current supply circuit in parallel with the output FET to maintain a continuous quiescent current in the driver set. The bias circuit may include a quiescent current controlling FET connected in parallel with the output FET and a biasing FET connected to bias the quiescent current controlling FET, the biasing FET being connected at a first side to the output node. In order to limit power dissipation in the drivers and maintain a low level of crossover harmonic distortion, the output FETs are turned off around the crossover point. As a result, the amplifier characteristics (open-loop gain, unity gain-bandwidth, slew-rate, etc.) at the quiescent operating point are controlled independently of the output FET characteristics. Preferably the output FET, the quiescent current controlling FET, and the biasing FET are fully integrated in a single integrated circuit.

According to another broad aspect of the invention, a circuit is presented for providing drive voltages to a voice coil motor (VCM). The circuit has two sets of high and low side drivers, each set for connection to respective opposite sides of the VCM. Each set of the high and low side drivers has first and second driver FET to respectively pull up and pull down an output node connected to the VCM. First and second circuits are connected in parallel respectively with the first and second driver FETs. Each of the first and second circuits is constructed to provide a continuous quiescent current in the driver set when the driver FETs are not conducting. Each of the first and second circuits includes a quiescent current controlling FET connected in parallel with a respective associated the driver FET and a biasing FET connected to bias the quiescent current controlling FET, while the respective the driver output FET is not conducting. Preferably, the driver FET, the quiescent current controlling FET, and the biasing FET are fully integrated in a single integrated circuit.

According to yet another broad aspect of the invention, a mass data storage device is presented. The mass data storage device is of the type having a circuit for providing drive voltages to a voice coil motor (VCM) of a mass data storage device. The circuit has two circuit sets, each including a high side driver and a low side driver for connection to respective opposite sides of the VCM. Each driver has an output FET to selectively connect an output node connected to the VCM to a first reference potential and a quiescent current supply circuit in parallel with the output FET to provide a continuous quiescent current in the Class-AB output stage of each set at the crossover point, while the output FET transistor is kept not conducting. The bias circuit has a quiescent current controlling FET connected in parallel with the output FET and a biasing FET connected to bias the quiescent current controlling FET, while the output FET is not conducting, the biasing FET being connected at a first side to the output node. Preferably, the output FET, the quiescent current controlling FET, and the biasing FET are fully integrated in a single integrated circuit.

According to yet another broad aspect of the invention, a method is presented for providing drive voltages to a voice coil motor (VCM) of a mass data storage device of the type having two circuit sets, each including a high side driver and a low side driver for connection to respective opposite sides of the VCM to alternatively pull up and pull down the respective opposite sides of the VCM. The method includes switchably applying an output drive current to the VCM and supplying a constant quiescent current to the output stage when the output drive current is crossing over. The continuous quiescent current is supplied to the Class-AB output stage to maintain linearity of operation thereof. The output drive current is switchably applied to the VCM by providing in each of the high and low side drivers a drive transistor to switchably connect the VCM to a reference potential. The continuous Class-AB current is supplied to the VCM by providing in each of the high and low side drivers a Class-AB transistor pair that is much smaller than and in parallel with the drive transistor pair. Each transistor of the Class-AB pair is biased to turn on at a lower bias voltage than the drive transistor. Preferably, the drive, Class AB and bias transistors are all integrated in a single integrated circuit.

BRIEF DESCRIPTION OF DRAWINGS

The invention is illustrated in the accompanying drawings, in which.

In the various figures of the drawing, like reference numerals are used to denote like or similar parts.

DETAILED DESCRIPTION

Figure 1:
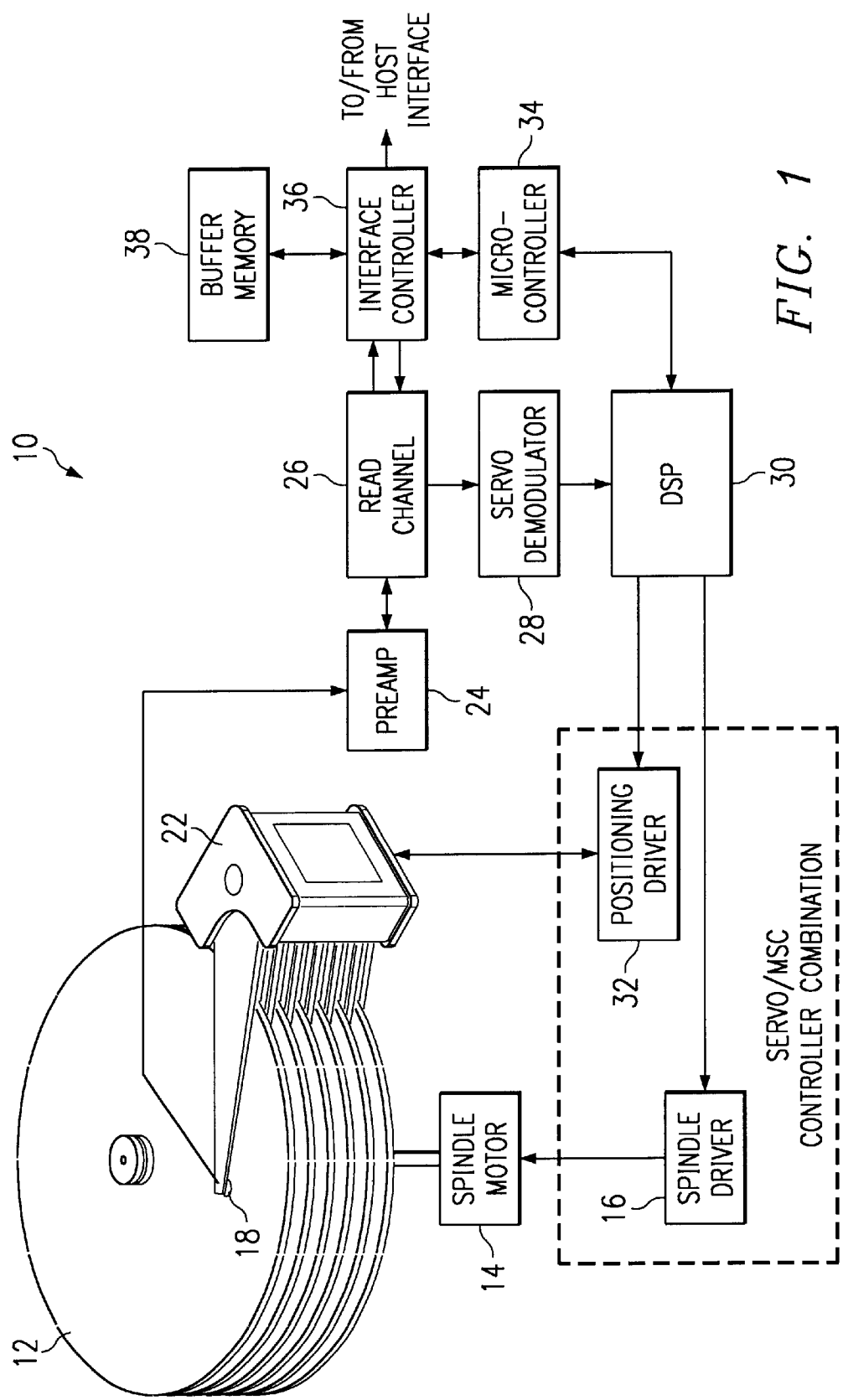
FIG. 1 is a block diagram of a generic disk drive system, illustrating the general environment in which the invention may be practiced.

A preferred embodiment of the invention is illustrated in the accompanying drawings, to which reference is now made. A block diagram of a generic disk drive system 10, which represents the general environment in which the invention may be practiced, is shown in FIG. 1. The system 10 includes a magnetic media disk 12 that is rotated by a spindle motor 14 and spindle driver circuit 16. A data transducer or head 18 is locatable along selectable radial tracks (not shown) of the disk 12 by a voice coil motor (VCM) 22. The radial tracks may contain magnetic states that contain information about the tracks, such as track identification data, location information, synchronization data, as well as user data, and so forth. The head 18 is used both to record user data to and read user data back from the disk, as well as to detect signals that identify the tracks and sectors at which data is written, and to detect servo bursts that enable the head to be properly laterally aligned with the tracks of the disk.

Analog electrical signals that are generated by the head 18 in response to the magnetic signals recorded on the disk are preamplified by a preamplifier 24 for delivery to read channel circuitry 26. Servo signals that are prerecorded on the disk 12 are detected and demodulated by one or more servo demodulator circuits 28 and processed by a digital signal processor (DSP) 30 to control the position of the head 18 via the positioning driver circuit 32. The servo data that is read and processed may be analog data that is interpreted by the DSP 30 for positioning the head 18.

A microcontroller 34 is typically provided to control the DSP 30, as well as an interface controller 36 to enable data to be passed to and from a host interface (not shown) in known manner. A data memory 38 may be provided, if desired, to buffer data being written to and read from the disk 12.

According to a preferred embodiment of the invention, three power transistors are used in each high and low side driver circuits to control the VCM. This reduces the number of design parameters per transistor and results in a well-controlled Class-AB quiescent current, which is essentially independent of the driver output impedance, $R_{DSon}$. The large size ratio between the sense transistor and the output power transistor in the traditional VCM drivers (driven by the output impedance $R_{DSon}$ requirement) that results in severe mismatch between the two transistors, as well as forcing the sense transistor into the sub-threshold region of operation, is substantially eliminated by the circuit of the invention. This is accomplished by employing an additional intermediate transistor in the driver on each side to set the Class-AB quiescent current, without impacting the output impedance requirement, which is still set by the output power transistor.

Figure 2:
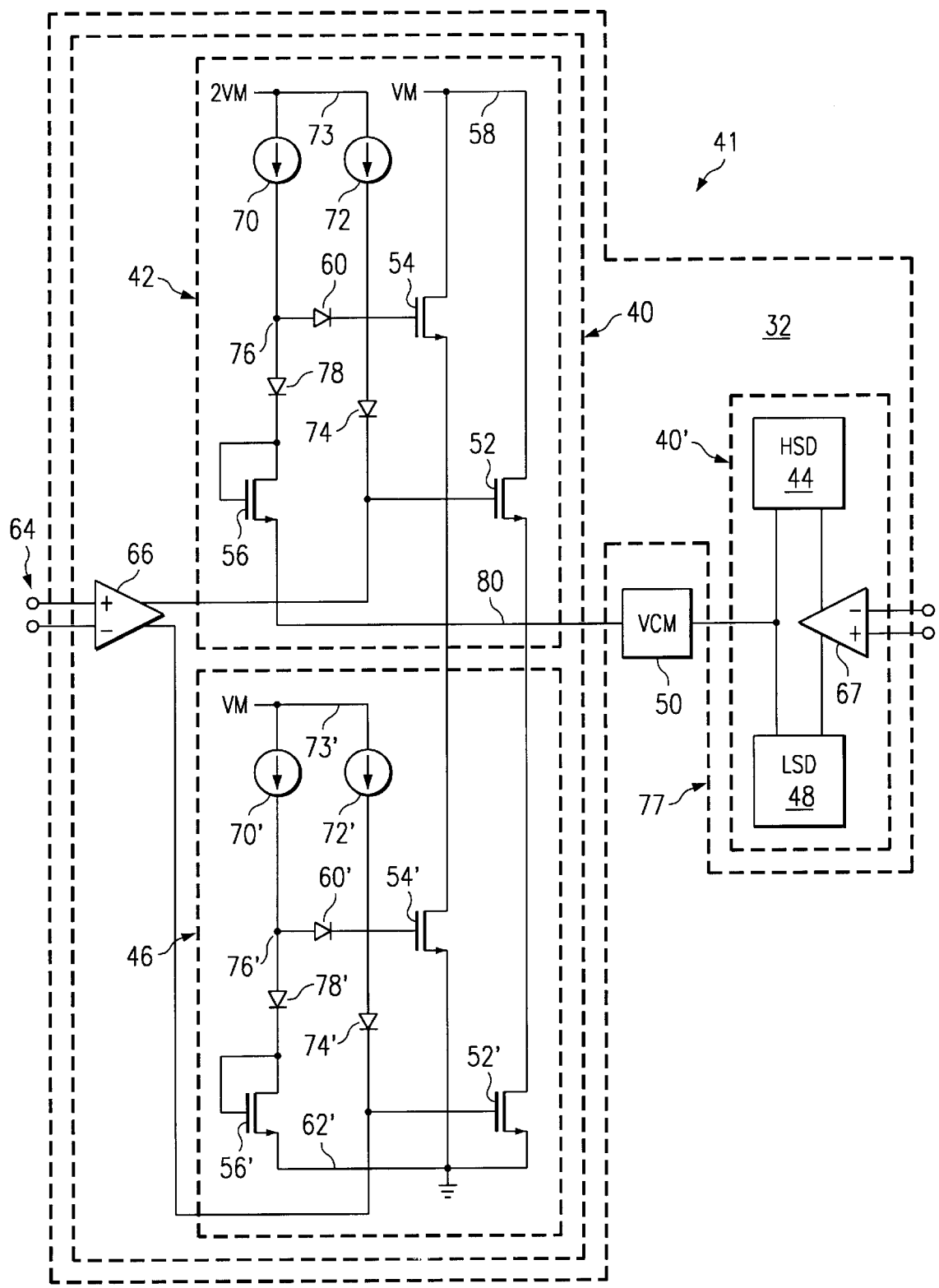
FIG. 2 is a schematic and block diagram of a portion of a VCM driver circuit, according to a preferred embodiment of the invention, that may be included in the positioning driver block of FIG. 1.

Thus, with additional reference now to FIG. 2, a voice coil motor (VCM) driver circuit 41, according to a preferred embodiment of the invention, is shown. The VCM driver circuit 41 includes two identical circuit halves 40 and 40' on respective opposite sides of the VCM 50. The VCM driver half 40 includes a high side driver 42 and a low side driver 46, and is connected to one side of the VCM 50. Similarly, the VCM driver 40' includes a high side driver 44 and a low side driver 48, and is connected to the opposite side of the VCM 50. Since the details of the high side drivers 42 and 44 are substantially the same, details of only circuit 42 are shown. Likewise, since the details of the low side drivers 46 and 48 are substantially the same, details of only circuit 46 are shown. Each driver circuit for the high and for the low side includes three transistors, 52, 54, and 56 for the high side and 52', 54', and 56' for the low side. In the embodiment shown, for example, the transistors 52, 54, 56, 52', 54', and 56' are NMOS transistors.

The high side driver transistor 52 is connected between a high side rail, VM, 58 and the output node 60. The corresponding low side driver transistor 52' is connected between the output node 60 and the ground rail 62. The driver transistors are relatively large, and are connected in an "h-bridge" configuration. These transistors are variously referred to herein as "h-bridge transistors," "driver transistors," or "output transistors." In the circuit configuration shown, the high and low side driver transistors 52 and 52' set the output impedance of the overall driver circuit 40 seen on the output node 60, as discussed more fully below. The driving signals to the respective high and low side driver transistors 52 and 52' on the left side are provided by driving circuitry at input nodes 64 via a differential amplifier 66. Similarly, a differential amplifier 67 provides driving signals to corresponding transistors (not shown) in the high and low side driver circuits 44 and 48 on the right hand side of the circuit.

Additionally provided in the driver circuit 40 are transistors 54 and 54' respectively connected between the supply rail 58 and the output node 60, and the output node 60 and the ground rail 62. The supply rail 58 is connected to a reference voltage, VM. The transistors 54 and 54' set the Class-AB quiescent currents of the circuit 40, in a manner more fully described below, and are referred to herein as "Class-AB transistors" or "quiescent current controlling transistors". Transistors 54 and 54' maintain continuous Class-AB current in the output stage of the circuit 40 in order to provide a smooth transition when the circuit 40 switches operation between the high side driver and the low side driver. Meanwhile, driver transistors 52 and 52' are kept not conducting during this switchover zone.

The Class-AB transistor pair 54 and 54' are biased by a current source 72 on the high side and a current source 72' on the low side. The high side current source 72 is connected directly from a reference voltage 73, in this case 2VM, to the gate of Class-AB transistor 54, and the low side current source 72' is connected directly from a reference voltage 73', in this case VM (same as 58), to the gate of Class-AB transistor 54'. The current sources 72 and 72' provide the gate charging current respectively to the gates of driver transistors 52 and 52' and of Class-AB transistors 54 and 54' to reduce the turn-on time thereof. In addition, the current sources 72 and 72' provide the bias current to the output stage of the differential amplifier stage 66.

Diodes 74 and 74' connect the gates of transistors 54 and 52 on the high side and 54' and 52' on the low side respectively to establish the gate voltage for the Class-AB transistors 54 and 54' to a voltage one diode drop above the voltages on the gates of driver transistors 52 and 52'.

A reference voltage is established on nodes 76 and 76' by the biasing transistors 56 and 56', isolated from the reference voltage nodes 76 and 76' by diodes 78 and 78'. The reference voltages on reference voltage nodes 76 and 76' are connected to the gates of the Class-AB transistors 54 and 54' by respective diodes 60 and 60' to control respectively the turn-on voltage of the Class-AB transistors 54 and 54' and driver transistors 52 and 52'.

The h-bridge transistors are typically very large, having widths as large as 80,000 µm, depending on the process technology and output impedance design requirement. On the other hand, the switching (biasing) transistors are generally kept as small as possible, having widths in the order of 20 to 100 µm, in order to save the occupied silicon area and to create large enough size ratio between the switching transistors and the Class-AB transistors, which have a quiescent current in the milliamp range. Consequently, power consumption can be limited in the switching transistor. In the past, these two design goals created several challenging aspects in the design of the VCM driver using the old two transistors per side scheme. These aspects include design and IC layout difficulties. Because of the large size ratio between the transistors, the layout of the transistors was difficult to accomplish and meet the expected design goals.

In contrast, the h-bridge transistors and the switching transistors of the circuit of the invention do not have a direct relationship. Instead, the layout matching is required between the switching transistors and the Class-AB intermediate transistors rather than the h-bridge transistors. Thus, for example, the switching and Class-AB transistors may have a ratio of 50 to 100. If the switching transistors 56 and 56' are 30 microns wide, the Class-AB transistors 54 and 54' may be of width of 1500 to 3000 $\mu$m. As a result, the transistors providing the class AB operation are relatively easy to lay out in integrated circuit design, and the h-bridge transistors can be modified, if needed without a significant impact to the rest of the design.

The diodes 60, 78, 74, 60', 78', and 74' in the circuit insure that the h-bridge transistors 52 and 52' are not involved in the switchover. As can be seen from the curves in FIG. 3, the effective switchover currents are produced by the Class-AB transistors, while the h-bridge transistors have currents approaching or at zero.

Figure 3:
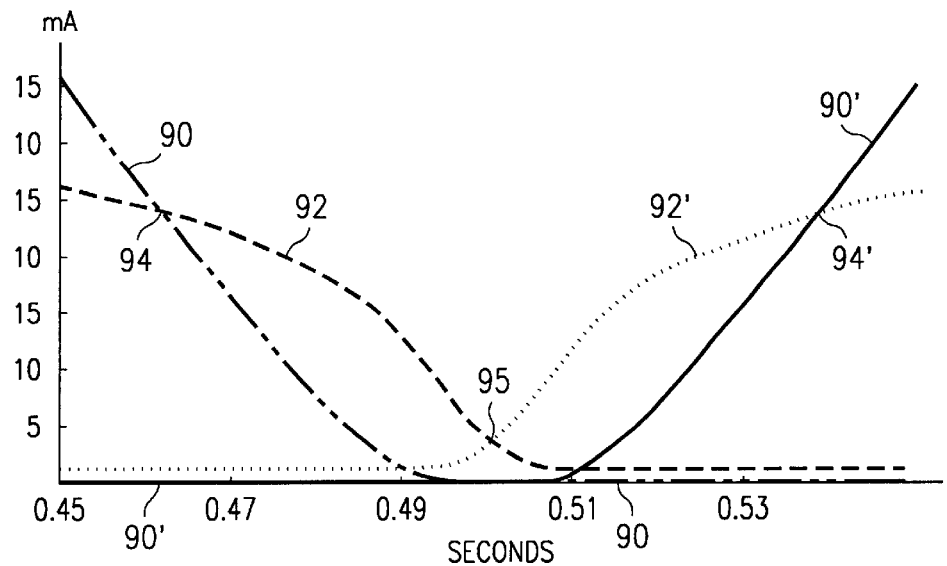
FIG. 3 shows curves of current in milliamps vs. time in seconds of the current flowing through the h-bridge or driver transistors and through the Class-AB switching transistors in a circuit constructed in accordance with a preferred embodiment of the invention.

More particularly, curves of the current flowing through the h-bridge transistors 52 and 52' and the Class-AB transistors 54 and 54' in milliamps vs. time, are shown in FIG. 3. The curves of the current flowing through the upper and lower h-bridge transistors 52 and 52' are denoted respectively by reference numbers 90 and 90'. Likewise, the curves of the current flowing through the Class-AB transistors 54 and 54' are denoted respectively by reference numbers 92 and 92'.

It can be seen that the currents in the region on either side of the Class-AB switchover points 94 and 94' are continuous at a relatively low current (about 14 mA). In addition crossover point 95 of the currents in the Class-AB transistors defines the quiescent operating point and, in the embodiment shown, is at about 3 mA. The 3 mA quiescent operating point was selected by design as the Class-AB current at the crossover point. It should be noted that other quiescent operating points can also be easily selected and designed, for example, merely by controlling the current flowing through the Class-AB transistors, by, for instance, modifying their widths.

In operation of the circuit 41, if the left side of the circuit is to be switched from, for example, the high side 42 to the low side 46 (and concomitantly from the low side to high side on the right side of the circuit), it can be seen that as the voltage across the operating high side driver transistor 52 falls as it prepares to be switched, its current decreases, shown, for example by curve 90. As it falls, the high side driver transistor 52 moves from its ohmic (linear) region (beyond the left side of the graph), to its saturation (pinch-off) region, shown, and finally to its subthreshold (cut-off) region shown on the right, where virtually no current flows in it. In the ohmic (linear) region of operation of the driver transistor 52, most of the total circuit current will flow through it, rather than through the much smaller associated Class-AB transistor 54. However, as the voltage across the driver ramps down and the current in the driver transistor 52 falls, the driver transistor 52 leaves the ohmic region and the current increases in the associated Class-AB transistor 54.

As the voltage continues to fall, the current in the Class-AB transistor 54 will become larger than the current in the driver transistor 52, and will cross over the current value in the driver transistor at crossover point 94 to dominate the total driver current supplied to the VCM. Because of the diode 74, the gate voltage of the Class-AB transistor 54 will always be above the voltage on the gate of the associated driver transistor 52. Nevertheless, as the voltage continues to drop, the current in the Class-AB transistor will continue to fall, until the Class-AB transistor enters its subthreshold region on the right side of the graph.

Figure 4:
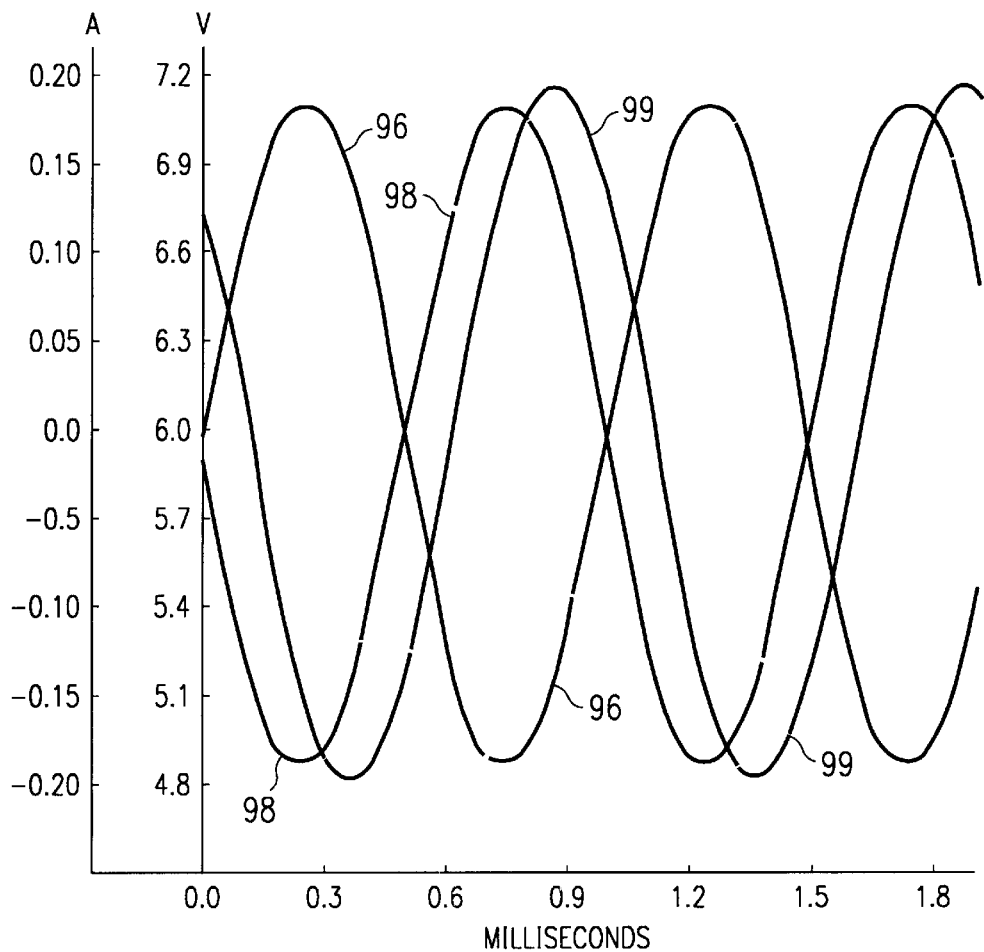
FIG. 4 is a series of simulated waveforms showing the voltage vs. time of the "P" and "N" terminals of a VCM driven at 1 KHz for a circuit constructed in accordance with the invention, as well as the resulting VCM current vs. time resulting therefrom, demonstrating the continuous nature thereof in operation.

In the meantime, the voltage applied to the Class-AB transistor 54' of the associated low side driver 46 is ramped up, causing it to conduct, resulting in the current denoted by the curve 92'. Similarly, the voltage on the low side driver transistor 52' also is ramping up, reversing the process described above. Therefore, the current is never extinguished between the crossover points 94 and 94', and the circuit is always maintained in Class-AB operating mode. As a result, no current discontinuities occur in the current within the circuit, as can be seen from the voltage and current waveforms of FIG. 4, simulated at 1 KHz. The voltages on the left and right side sides of the VCM are denoted by reference numerals 96 and 98. The total VCM current is denoted by reference numeral 99. The resulting continuous current produces many of the advantages realized by the circuit of the invention.

As mentioned, one of the advantages of the circuit of the invention is that all of the transistors 52, 54, 56, 52', 54', and 56' of each driver section can be, and preferably are, fully integrated onto a single silicon wafer 77. In such fully integrated case, it will be appreciated that each of the transistors can be constructed with similar characteristics, particularly $V_{th}$ and k' to assure that no discontinuities occur at the Class-AB switchover point. ($V_{th}$ is the threshold voltage of the transistor, k' is a function of $\mu_n$, the average electron mobility in the channel, and $C_{ox}$ the gate oxide capacitance per unit area.) Although not essential, optimum performance can be achieved by fully integrating the transistors of the circuit onto a single chip. At a minimum, the large capacitances that are inherent in large external drive transistors can be eliminated. This will significantly increase the bandwidth of the circuit. Because of the large capacitances of such external devices, it may be difficult to achieve the continuous Class-AB characteristics that are achieved by the fully integrated embodiment of the invention using such external devices.

In the past, in order to maintain low level of crossover harmonic distortion in the drivers the quiescent current at switchover was on the order of 20 mA. The quiescent current at switchover of the circuit of the invention is on the order of 3 mA with the same or lower level of distortion. The latter circuit has achieved the desired level of total harmonic distortion (THD) with significantly lower power. For example, in a 12 V system, the power dissipation in the Class-AB stages of the circuit of the intention around the switchover zone is in the order of 0.072 watts, compared to 0.48 watts of the previous systems.

In addition, in the past, when design changes necessitated changes to the circuit output impedance, because of the dependence on the h-bridge and the switching transistors to implement the Class-AB operation, virtually all of the transistors had to be redesigned. In contrast, since the h-bridge transistors take virtually no part in the Class-AB switching, essentially no changes are made to the Class-AB transistor pair. As a result, no significant change in the circuit may be required.

Thus, it is apparent that numerous advantages may be gained by the circuit of the invention. For example, much better control and predictability of the Class-AB quiescent current can be achieved as a result of avoiding the severe mismatch between the sense transistor and the output power transistor. The subthreshold operation of the sense transistor, which is undesirably experienced in the traditional two-transistor-per-side-driver architecture, can be completely eliminated. Also, the new architecture gives designers more flexibility to change or tweak the output impedance ($R_{DSon}$) of the drivers, if required, without a significant impact to the rest of circuit. Finally, using the circuitry of the invention, predictable power consumption and crossover linearity of the VCM current can be achieved.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

What is claimed is:

1. A circuit for providing drive voltages to a voice coil motor (VCM) of a mass data storage device, said circuit having two circuit sets, each set including a high side driver and a low side driver for connection to respective opposite sides of said VCM, each said driver comprising:
    an output FET to selectively connect an output node connected to said VCM to a first reference potential; and
    a quiescent current supply circuit in parallel with said output FET to provide a continuous quiescent current within said circuit at least when said output FET transistor is not conducting.

2. The circuit of claim 1 wherein said quiescent current supply circuit comprises:
    a quiescent current controlling FET connected in parallel with said output FET; and
    a biasing FET connected to bias said quiescent current controlling FET to turn on at least when said output FET is not conducting, said biasing FET being connected at a first side to said output node.

3. The circuit of claim 2 wherein said output FET, said quiescent current controlling FET, and said biasing FET are fully integrated in a single integrated circuit.

4. The circuit of claim 2 wherein said output FET primarily establishes an output impedance of said circuit and said quiescent current controlling FET primarily establishes a quiescent current of said circuit.

5. The circuit of claim 2 further comprising:
    a first diode between gates of said quiescent current controlling FET and said driver FET;
    a first current source between a second reference potential and said gate of said quiescent current controlling FET to charge said gates of said quiescent current controlling FET and said output FET;
    a second diode connected at one side to a second side of said biasing FET and
    at another side to a bias node;
    a second current source connected between said bias node and said second reference potential to establish a bias voltage at said bias node;
    and a third diode connected between said bias node and said gate of said quiescent current controlling FET to apply said bias voltage to said gate of said quiescent current controlling FET.

6. The circuit of claim 5 wherein said second reference potential is about twice as large as said first reference potential.

7. A circuit for providing drive voltages to a voice coil motor (VCM), said circuit having two sets of high and low side Class AB drivers, each set for connection to respective opposite sides of said VCM, comprising:
    first and second driver FETs to respectively pull up and pull down an output node connected to said VCM; and
    first and second circuits in parallel respectively with said first and second driver FETs, each of said first and second circuits being constructed to provide a continuous quiescent current within said set of high and low side drivers at least when neither said first nor said second driver FETs are conducting.

8. The circuit of claim 7 wherein each of said first and second circuits comprises:
    a quiescent current controlling FET connected in parallel with a respective associated said driver FET;
    and a biasing FET connected to bias said quiescent current controlling FET to turn on at least when said respective said driver FET is not conducting.

9. The circuit of claim 8 wherein said driver FET, said quiescent current controlling FET, and said biasing FET are fully integrated in a single integrated circuit.

10. The circuit of claim 8 wherein said driver FET primarily establishes an output impedance of said circuit and said quiescent current controlling FET primarily establishes a quiescent current of said circuit.

11. The circuit of claim 8 wherein each of said first and second circuits further comprises:
    a first diode connected between a gate of said quiescent current controlling FET and a gate of said associated driver FET;
    a first current source connected between a first reference voltage and said gate of said quiescent current controlling FET to set a turn on voltage for said quiescent current controlling FET above a turn off voltage of said associated driver FET;
    a second diode connected at one side to said biasing FET;
    a second current source connected at a bias node between said VCM and a second reference voltage, wherein a biasing voltage is produced at said bias node;
    and a third diode connected between said bias node and said gate of said quiescent current controlling FET to apply said biasing voltage to said gate of said quiescent current controlling FET.

12. The circuit of claim 11 wherein said second reference voltage is about twice as large as said first reference voltage.

13. A mass data storage device having a circuit for providing drive voltages to a voice coil motor (VCM) of the mass data storage device, said circuit having two circuit sets, each set including a high side driver and a low side driver for connection to respective opposite sides of said VCM, each of said drivers comprising:
    an output FET to selectively connect an output node connected to said VCM to a first reference potential; and
    a quiescent current supply circuit in parallel with said output FET to provide a continuous quiescent current within said circuit set at least when said output FET transistor is not conducting.

14. The mass data storage device of claim 13 wherein said quiescent current supply circuit comprises:
    a quiescent current controlling FET connected in parallel with said output FET; and
    a biasing FET connected to bias said quiescent current controlling FET to turn on at least when said output FET is not conducting, said biasing FET being connected at a first side to said output node.

15. The mass data storage device of claim 14 wherein said output FET, said quiescent current controlling FET, and said biasing FET are fully integrated in a single integrated circuit.

16. The mass data storage device of claim 14 wherein said output FET primarily establishes an output impedance of said circuit and said quiescent current controlling FET primarily establishes a quiescent current of said circuit.

17. The mass data storage device of claim 14 further comprising:

a first diode between gates of said quiescent current controlling FET and said output FET;

a first current source between a second reference potential and said gate of said quiescent current controlling FET to charge said gates of said quiescent current controlling FET and said output FET;

a second diode connected at one side to a second side of said biasing FET and at another side to a bias node;

a second current source connected between said bias node and said second reference potential to establish a bias voltage at said bias node;

and a third diode connected between said bias node and said gate of said quiescent current controlling FET to apply said bias voltage to said gate of said quiescent current controlling FET.

18. The mass data storage device of claim 17 wherein said second reference potential is about twice as large as said first reference potential.

19. A method for providing drive voltages to a voice coil motor (VCM) of a mass data storage device of the type having two circuit sets, each set including a high side driver and a low side driver for connection to respective opposite sides of said VCM to alternatingly pull up and pull down said respective opposite sides of said VCM, comprising:

switchably applying an output drive current to said VCM; and supplying a continuous quiescent current within said circuit sets at least when said output drive current is below a predetermined value.

20. The method of claim 19 wherein said supplying a continuous quiescent current to said VCM comprises maintaining a Class-AB mode of operation each of said two circuit sets.

21. The method of claim 19 wherein said switchably applying an output drive current to said VCM comprises providing in each of said high and low side drivers a drive transistor to switchably connect said VCM to a reference potential and wherein said supplying a continuous quiescent current comprises providing in each of said high and low side drivers a Class-AB transistor that is smaller than and in parallel with said drive transistor, and further comprising biasing said Class-AB transistor to turn on at a higher voltage than said drive transistor.

22. The method of claim 21 wherein said providing drive and Class-AB transistors comprises providing respective FET devices for said drive and Class-AB transistors.

23. The method of claim 22 further comprising fully integrating at least said drive, Class AB, and bias transistors in a single integrated circuit.

24. The method of claim 22 wherein FET devices are NMOS devices.

\* \* \* \* \*